Figure 5:
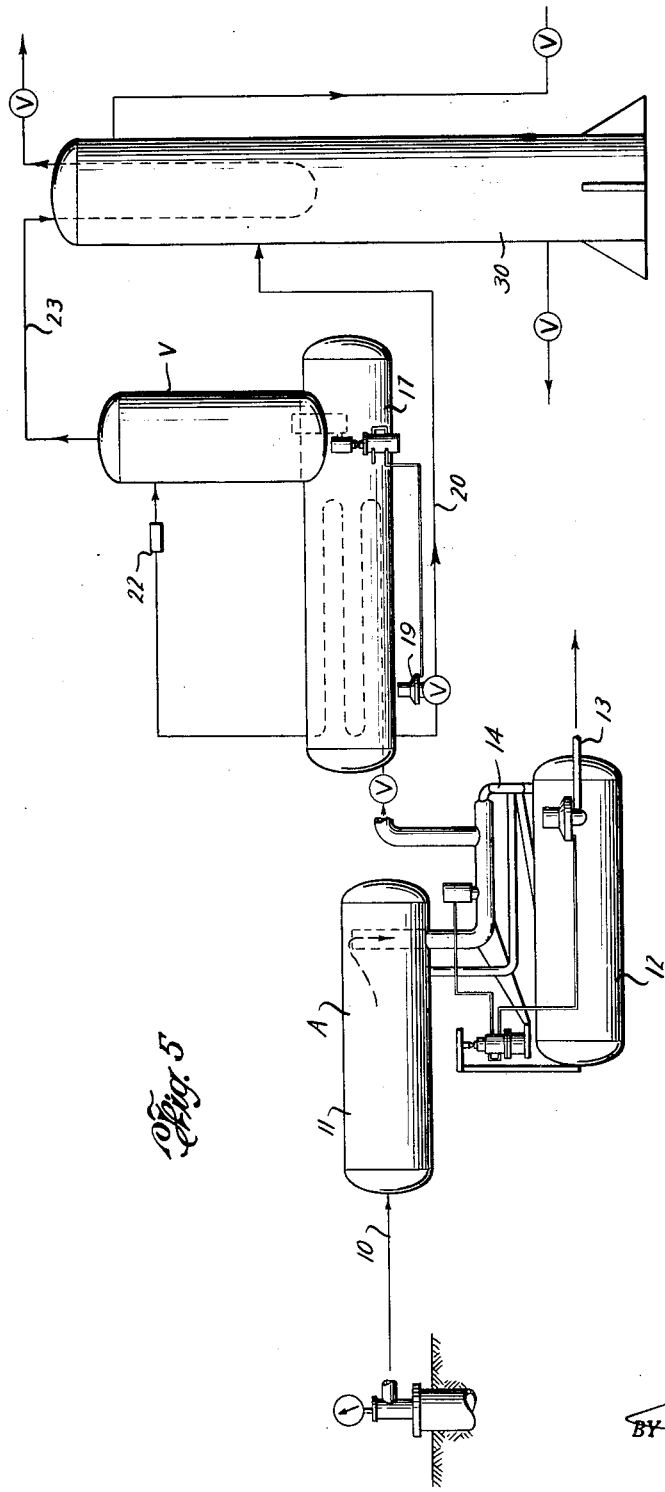

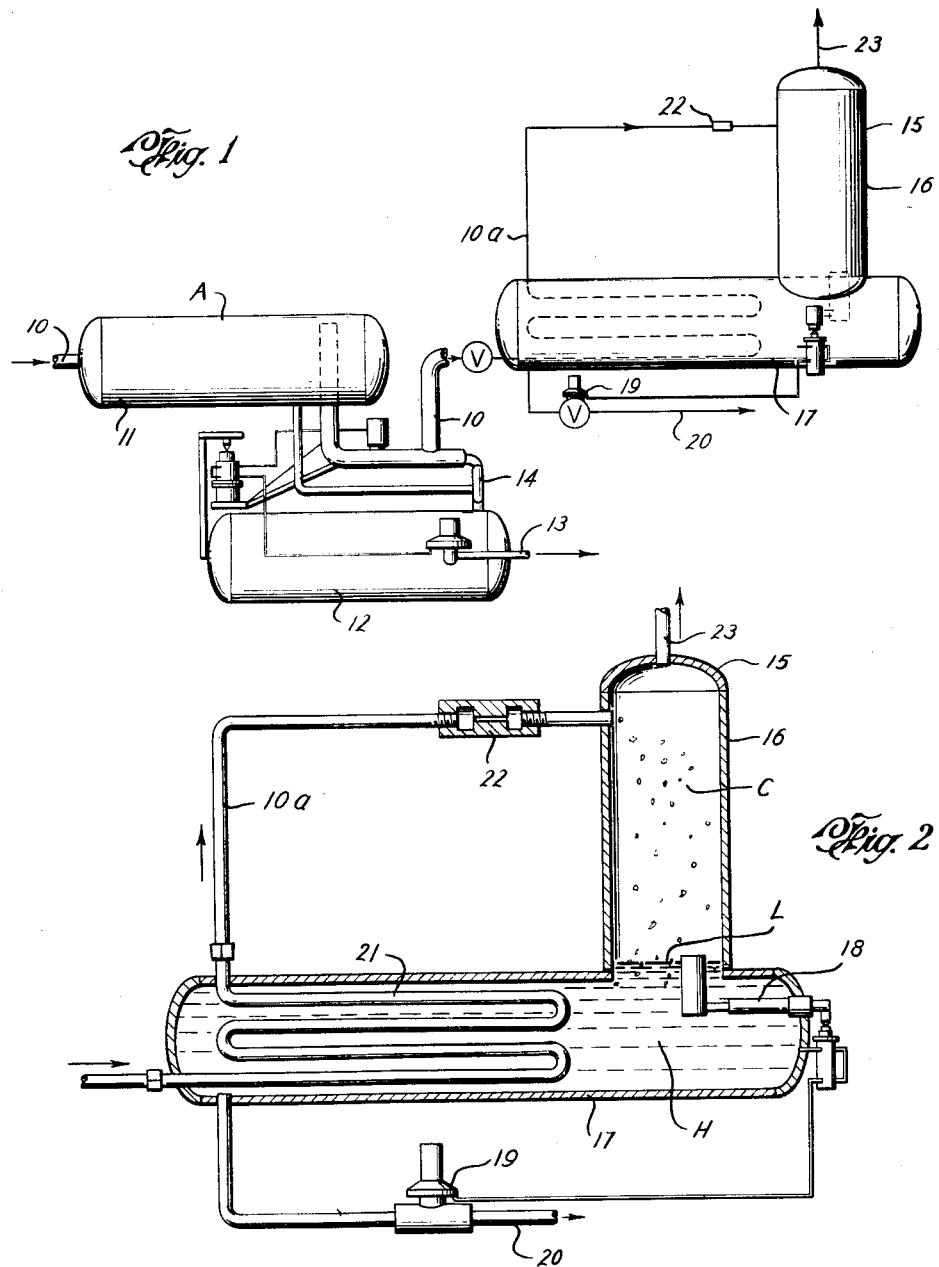

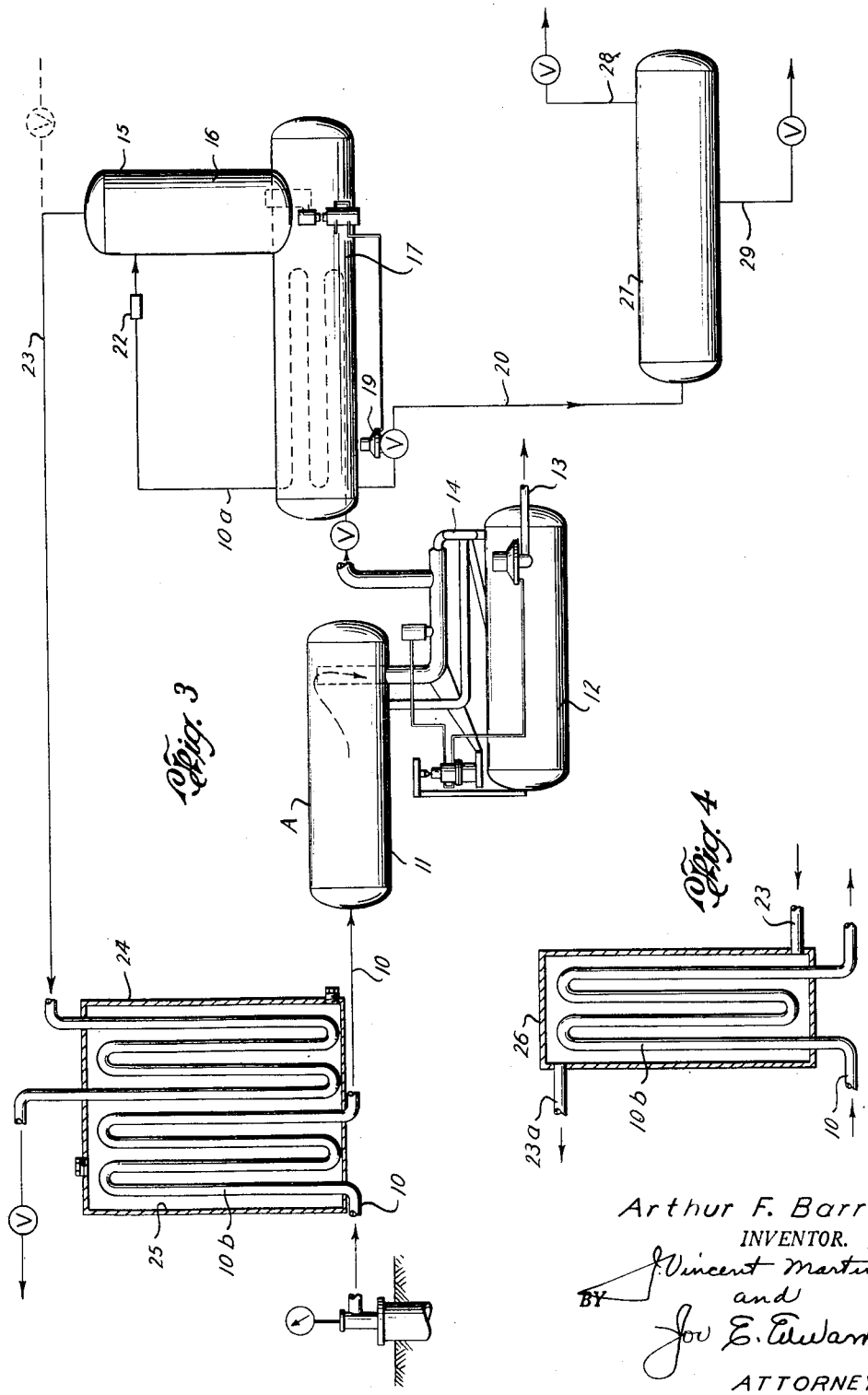

Oct. 31, 1950 A. F. BARRY 2,528,028
METHOD AND MEANS FOR SEPARATING HYDROCARBON LIQUIDS
AND WATER FROM HIGH-PRESSURE GAS STREAMS
Filed March 20, 1950 5 Sheets-Sheet 3

Arthur F. Barry
INVENTOR.
BY J. Vincent Martin
and
Joe E. Edwards
ATTORNEYS

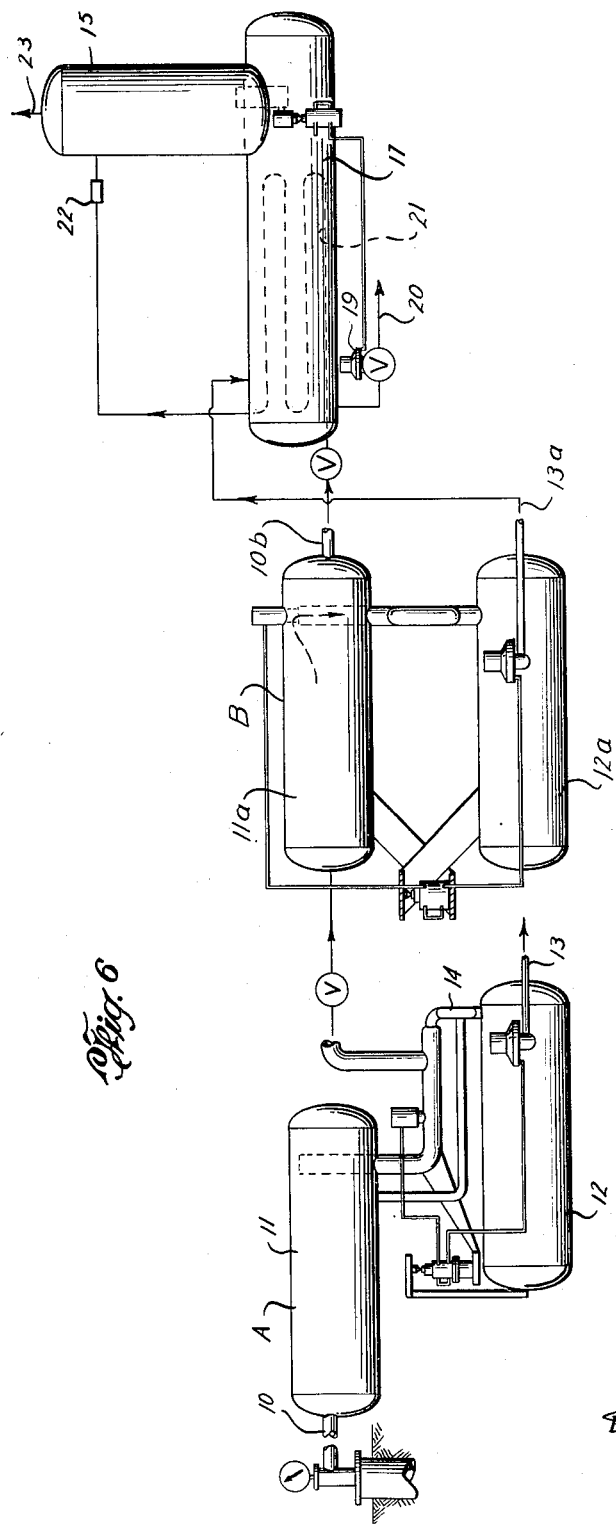

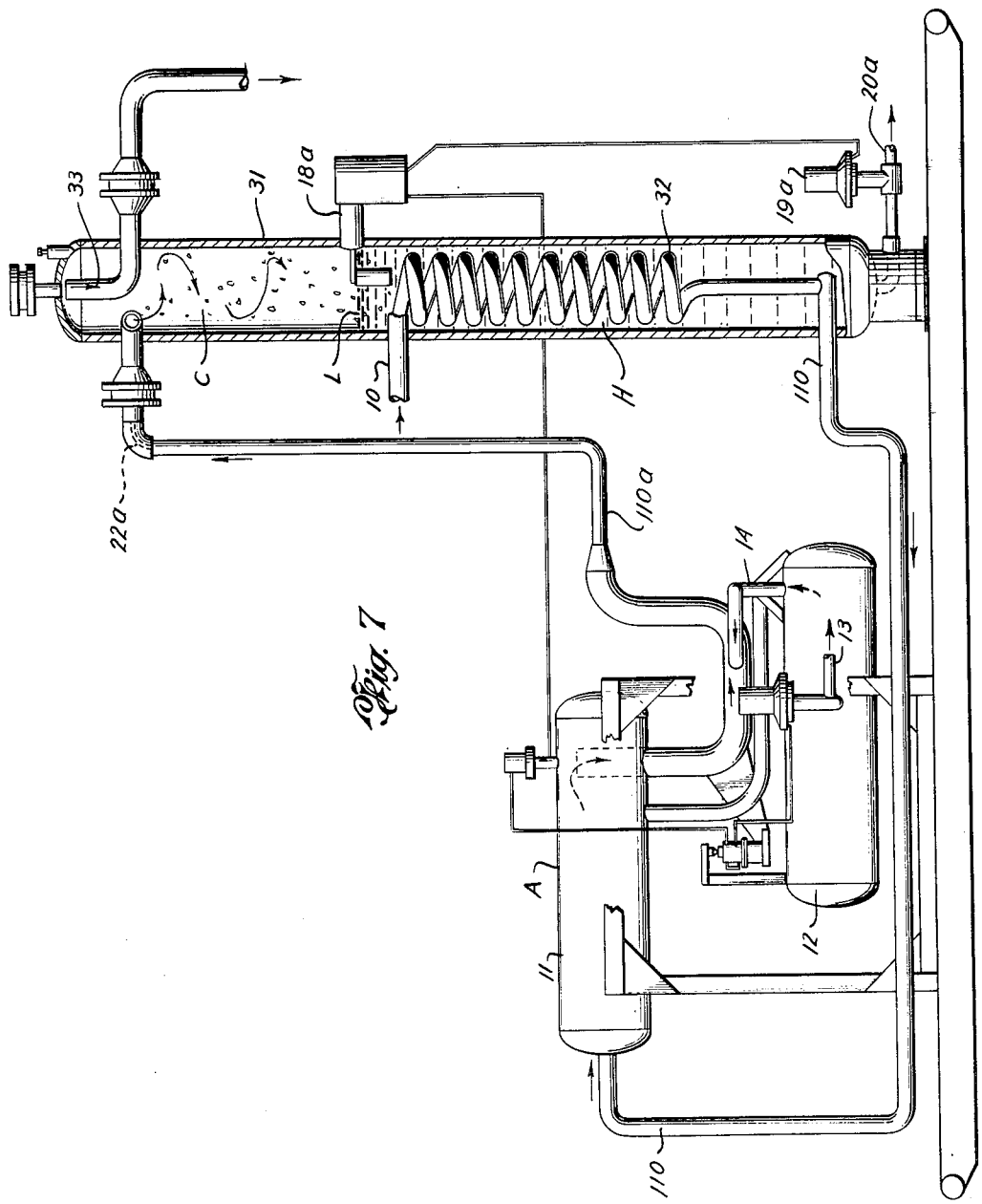

Patented Oct. 31, 1950

2,528,028

UNITED STATES PATENT OFFICE 2,528,028

METHOD AND MEANS FOR SEPARATING HYDROCARBON LIQUIDS AND WATER FROM HIGH-PRESSURE GAS STREAMS

Arthur F. Barry, Conroe, Tex.

Application March 20, 1950, Serial No. 150,690

18 Claims. (Cl. 260—676)

This invention relates to new and useful improvements in methods of and means for separating hydrocarbon liquids and water from high pressure gas streams.

The invention relates particularly to apparatus for use in separating "condensate" or "distillate" and free water from a flowing gas stream under relatively high pressures.

In high pressure distillate wells wherein the "distillate" or hydrocarbon liquids or condensate and water are present in the flow stream in a vapor phase under the high well pressures and temperatures, the flow stream has the gas therein saturated with water vapor with such water vapor originating from the connate water in the formation. If the sub-surface formation pressure and temperature could be maintained there would be substantially no condensation of hydrocarbon liquid or condensate and water in the flow line. However, as the gas flows upwardly toward the surface, a pressure and temperature drop occurs with the result that condensation takes place and the hydrocarbon components as well as free water occur in the liquid phase in the flow line.

It is well known that a pressure reduction in a high pressure gas stream increases the water vapor carrying capacity of the gas while a reduction in temperature has the opposite effect, that is, the water vapor carrying capacity is decreased. In a typical high pressure gas well, the temperature reduction effect is greater than that of the pressure drop with the result that as the pressure and temperature are reduced condensation of water occurs.

As the high pressure gas is passed through the usual control devices from the high pressure region or zone in the well to the comparatively low pressure region or zone in the pipe lines, the pressure reduction results in extreme cooling due to the expansion of the gas. This cooling effect, which is produced as the stream is taken through a pressure reducing choke or regulator, may cause the formation of gas-water hydrates or frozen particles which may be either ice particles or solidified particles consisting of a combination of water and hydrocarbons. The hydrates or frozen particles so formed tend to accumulate about the pressure reducing choke or valve and also in the various control devices in the flow line and may ultimately completely close said line to shut off flow therethrough.

The freezing problems encountered in high pressure gas lines are primarily due to the gas-water hydrates and obviously, if substantially all of the water can be removed these difficulties are overcome. It is a well known fact that water must usually exist in a liquid state in order for gas hydrates to form and thus, if the gas is maintained above dew point conditions with no liquid water existing in the stream, no hydrates can form.

Various types of separators and water knock-outs have come into general use for separating the free water from the high pressure gas flow line and some of these devices are effective for removing substantially all of the free water which is present in the line at the high well pressure. However, it is a known fact that even though all free water is removed, the gas in the flow stream remains saturated with water vapor and contains gaseous hydrocarbons since the knockout removes only "free water," that is, water which is present in the stream in the liquid phase. Therefore, after passing through a separator or knockout apparatus the gas still contains water and hydrocarbons in the vapor phase and upon a subsequent pressure reduction which will cause further cooling of the gas, a further condensation may occur.

If the subsequent pressure reduction is sufficient to cause extreme cooling, additional hydrates or frozen ice particles may be formed in the stream and freezing difficulties may be encountered in the system beyond the point of pressure reduction. It becomes evident that if the water in the gas stream, which has been converted to the liquid phase and then solidified by the temperature reduction, is removed while the gas is still cold and at a temperature below the melting point of the hydrates or frozen particles, there will be no return of the water as a vapor to the gas stream because at the lower temperature the vapor carrying capacity of the gas is reduced. Further, if the cooling zone created by the pressure reduction is the coldest zone in the system and removal of the water is carried out in that zone, then subsequent increase in temperature of the gas stream without a change in pressure will cause the gas to be under-saturated, that is, it has the capacity to carry more water vapor than is actually contained therein.

As explained above, when a pressure and temperature reduction occur in the gas stream flowing from a typical high pressure gas well, the temperature effect is greater than the pressure reduction effect so that condensation of water takes place; conversely, when the pressure and temperature of the gas is increased, as by adiabatic compression, the temperature effect is still dominant whereby vaporization of the water occurs. The hydrocarbon components which are present in the typical high pressure gas-condensate well are not effected in the same manner as water upon pressure and temperature changes and therefore, increasing the recovery of these hydrocarbons while still eliminating the formation of hydrates which cause freezing troubles has presented a problem.

The condensation of hydrocarbons from the gas stream is due to a reduction in temperature and a reduction in pressure within certain limits. At a normal operating pressure in the high pressure separator, a reduction in temperature will increase condensation of hydrocarbons or "distillate"; this holds true down to extremely low temperatures, ordinarily well below those normally reached, but at extremely low temperature the hydrocarbons will again begin to vaporize.

With regard to pressure effect on the condensation of distillates, the phenomenon of "retrograde condensation" occurs. As is well known, at bottom hole pressure and temperature, all components of the well stream are in the vapor phase. If the temperature remained constant with a reduction in pressure, condensation of hydrocarbon components occurs down to a pressure in the order of 1000 to 1200 pounds, at which point further pressure reduction will cause vaporization of the hydrocarbon liquid. It thus becomes obvious that as pressures and temperatures are reduced as a high pressure gas stream leaves the bottom of the well, condensation of the hydrocarbon liquids and water will occur. Pressure reduction below the "retrograde condensation" range would result in continued condensation of the water due to the cooling effect of gas expansion but hydrocarbon condensation would be slowed because of said pressure reduction below the critical point.

It has been the practice to operate the usual separator at a pressure within the range of maximum hydrocarbon condensation, or within the "retrograde condensation" range but the extreme cooling caused by the pressure reduction from the high well pressure has caused freezing due to hydrates. To overcome freezing, heat has been applied to the gas stream in advance of the point of pressure reduction so that after the pressure drop, the temperature is retained above the hydrate formation point at the separator pressure. However, heating impairs recovery of hydrocarbons and the recovery of hydrocarbons which could be otherwise obtained by decreasing temperatures has been limited by the hydrate formation point. If the cause of the hydrates is removed, separator temperatures can be reduced to correspondingly increase the recovery of the hydrocarbons.

It is, therefore, the main object of this invention to separate the maximum amount of both water and hydrocarbon liquid from the gas by carrying out the separating step within the optimum hydrocarbon liquid recovery pressure range and at a low temperature which is below the hydrate formation point at the pressure at which the separator is operating.

It is another object of this invention to provide an improved method for effecting the removal of liquids from a high pressure gaseous stream wherein the liquids are originally in a vapor phase under the initial pressure and temperature of said stream.

An important object of the invention is to provide an improved method wherein free water which may be present in a high pressure gas stream is first removed from the gas stream after which the pressure of the stream is reduced to a point where the cooling effect created by such pressure reduction is sufficient to cause condensation of the hydrocarbon components and water, initially in the vapor phase in said stream, whereby separation of said hydrocarbon components and said water from the gas may be effectively carried out.

A still further object is to provide an improved method for increasing recovery of hydrocarbon liquids or condensate and for dehydrating a flowing gas stream which includes separating the hydrocarbon liquids and water from the gas in a cold zone having a temperature below the melting point of hydrates and also having a temperature which is lower than any other temperature in the system through which the gas flows, whereby the separation is effected with the gas at a temperature which is less than any temperature subsequently reached by the gas throughout the gas system to thereby prevent the formation of hydrates at subsequent points in the system beyond the zone of separation.

Still another object is to provide an improved method, of the character described, wherein the cold gas stream, following separation of the liquids therefrom, may be utilized to pre-cool the flow stream prior to removal of the free water therefrom to encourage condensation of liquids in the stream; or wherein said cold gas stream may be utilized to cool the liquids which have been previously separated from the gas and removed from the cold separation zone, to effect condensation of any liquids which may have returned to a vapor phase subsequent to the separating step.

Another object is to provide an improved apparatus for increasing recovery of hydrocarbon liquids from and for simultaneously dehydrating high pressure gas streams including, removing the free water from the stream, thereafter reducing the pressure of the stream to lower the temperature and thereby cause condensation of liquids and the formation of hydrates or frozen particles, maintaining the gas at a temperature below the melting point of the hydrates or frozen particles and conducting said gas from the point of pressure reduction and cooling, thereafter liquefying the hydrates or particles and withdrawing the water as a liquid with any other liquids which have been condensed by the cooling step.

Still another object is to provide an improved apparatus, of the character described, wherein the flow stream is directed through a restricted aperture to effect a pressure and temperature reduction which will be sufficient to cause frozen particles to be formed, after which the stream having the frozen particles therein is conducted to a separating vessel wherein the frozen particles may precipitate downwardly into a warm zone within the vessel while the gas may rise within a cold zone within said vessel, with the arrangement being such that the gas escaping from the separating vessel is maintained at a temperature which is below the melting point of the frozen particles, whereby said gas is incapable of picking up and carrying any of the condensate within the warm zone of the vessel.

Still another object is to provide an apparatus of the character described, wherein the heat of the initial flow stream is utilized as a means for heating the warm zone of the separating vessel so that the hydrates formed by the temperature reduction of the gaseous stream may be liquefied; the utilization of the heat of the initial flow stream eliminating the requirement for auxiliary sources of heat for heating the warm zone of the separating vessel.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a diagrammatic view of an apparatus, constructed in accordance with the invention, for practicing the improved method, Figure 2 is a longitudinal sectional view of the separator vessel, Figure 3 is a view somewhat similar to Figure 1 and illustrating a heat exchanger in advance of the free water knockout unit and showing a second separation step, Figure 4 is a sectional view of a modified form of heat exchanger for use in the form of apparatus illustrated in Figure 3, Figure 5 is a view similar to Figure 1 but adding a second separating step and illustrating the utilization of cold gas from the first separating step in the second separating step, Figure 6 is a diagrammatic view illustrating a hydrocarbon liquid removal unit as well as a free water knockout unit in advance of the separating vessel, and Figure 7 is a view partly in section and partly in elevation showing the structural detail of one form of separating vessel.

The invention will be described herein as applied to the main flow line or pipe which extends from a high pressure gas well but it is pointed out that the invention may be used with any high pressure gas line for the purpose of separating liquids therefrom.

In the drawings, the numeral 10 (Figure 1) designates a high pressure flow line or pipe which conducts a high pressure gas stream from a well. The flow stream in the pipe or line 10, under the high pressure and high temperature conditions within the well bore, is gaseous and hydrocarbon components and water are contained therein in a vapor phase. As the flow stream approaches the surface of the ground the temperature of the stream decreases from the relatively high temperature occurring in the bottom of the well bore and this decrease in temperature will result in a condensation of some of the hydrocarbon components and water within the stream so that said components assume a liquid state. Various types of water knockout units have been devised for separating the free water and the condensed liquids which are present in a high pressure gas stream and one such form of water knockout unit A is illustrated in Figure 1. The flow line or conduit 10 is connected with an upper separating vessel 11 of the unit A and in this vessel the free liquids are separated from the gas stream and said liquids are conducted through suitable piping to a lower accumulating vessel 12. From the vessel 12 free water is discharged through an outlet 13 while any hydrocarbon liquids which have passed into the vessel 12 are conducted back into the flow line 10 through a pipe 14. Thus, after passing through the free water knockout unit A, the high pressure gas stream is composed of gas with some hydrocarbons in the liquid phase, additional hydrocarbons in the vapor phase and water in the vapor phase. Although the stream has undergone some temperature reduction, said stream is still of a relatively high pressure and above the range of maximum retrograde condensation.

The water knockout unit A is satisfactory for removing the free water but is not capable of removing any water which may yet be in a vapor phase in the gas stream and for the purpose of removing the additional water a separator vessel 15 is provided. As shown in Figures 1 and 2, this separator vessel comprises an upright tank portion 16 and a lower liquid accumulating tank portion 17. As will be explained, liquid is maintained at the level L in the tank 17 by means of a suitable float mechanism 18 which actuates a liquid discharge or dump valve 19 controlling flow through a discharge line 20.

The body of liquid which is maintained in the tank 17 is heated to provide a heated zone H in the lower portion of the chamber formed by the two vessels. The space within the upright tank 16 of the vessel which is above the liquid level comprises a cold zone C and as will hereinafter appear, it is desirable that the zone C be maintained at a temperature which will be below the melting point of hydrates.

The flow line or conduit 10 after passing through the free water knockout unit A is directed to a heating coil 21 which is disposed within the tank 17. The other end of the coil 21 is connected through a flow line or pipe 10a with the upper end of the tank 16 of the separator vessel 15. The coil 21 is disposed within the tank 17 and is immersed within the liquid therein and obviously the relatively hot flow stream is utilized to impart heat to the body of liquid within the tank 17. The heat exchange which will occur between the hot gas stream and the liquid in the tank 17 will result in some cooling of the flow stream whereby condensation of liquids in the stream are encouraged. The flow stream then passes through the pipe or conduit 10a and is discharged into the upper end of the upright tank 16 of the vessel.

Connected in the conduit 10a is a pressure reducing device 22 which is illustrated as an ordinary fixed orifice choke although it could be a pressure regulator or some other pressure reducing apparatus. The purpose of the choke 22 is to reduce the pressure of the flow stream downwardly to a point where the cooling effect produced by the expansion of the gas at the point of pressure reduction will cause a condensation of hydrocarbons and water which were in a vapor phase in the stream under high pressure; the pressure to which the flow stream is reduced beyond the choke 22 is preferably within the retrograde condensation range whereby maximum condensation of hydrocarbons occurs. The cooling effect obtained beyond the choke is also sufficient to form hydrates and may freeze some of the water to form frozen particles in the conduit 10a immediately beyond the point of pressure reduction. The flow stream having condensed hydrocarbon liquids and hydrates or frozen particles therein is discharged into the upper portion of the upright tank 16 of the vessel 15 and obviously this stream is extremely cold and is well below the point at which the hydrates or frozen particles will liquefy or melt.

Upon entry of the gas stream having the condensed liquids and hydrates or frozen particles therein into the tank 16 the liquids and hydrates or frozen particles will precipitate or fall downwardly within the tank while the gas will rise upwardly and escape through a withdrawal pipe 23 which extends from the upper end of the tank 16. The liquids and the frozen particles will fall downwardly into contact with the heated body of liquid within the lower tank 17 of the vessel and the heat of this liquid body is sufficient to liquefy or melt the frozen particles which are then reconverted to water. Through the liquid level control apparatus 18, discharge of the admixed hydrocarbon liquids and water is effected through the discharge line 20 but at all times the level L of the vessel is controlled; although this level is shown at the point L in Figure 2 such level is variable although it is desirable that the major portion of the heat exchange coil 21 be immersed.

It is pointed out that when the temperature of the gas is lowered a condensation of liquid, which was maintained in a vapor phase at the higher temperature, occurs. If the liquid is then separated while the gas is maintained at the low temperature which condensed such liquid and is conducted away from the liquid there will be no reabsorption of the liquid by the gas and the gas will be maintained in a relatively dry condition. If the temperature of the gas is thereafter raised the vapor carrying capacity of the gas will be increased but if there is no liquid available in contact with the gas there will be no increase in the liquid content of said gas with the result that said gas is, in effect, under-saturated after its temperature has been raised.

It is to carry out the separation of the gas from the liquids while the temperature of the gas is below the melting point of hydrates that the present separator vessel 15 has been provided. It will be evident that as the gas stream passes through the choke 22 the pressure reduction is sufficient to effect a cooling of the gas to the point where hydrates or frozen particles will be formed. The gas stream is maintained in this cold condition and is directed into the upper zone C of the tank 16 and in this tank the condensed liquids and frozen particles precipitate or fall downwardly. The cold gas which is constantly entering the upper portion of the tank 16 will function to maintain the cold zone C within the upper portion of the tank adjacent the point of entry of the gas stream and thus, the liquids and frozen particles must fall downwardly through this cold zone and into the heated zone H in the lower portion of the vessel. The gas is withdrawn through the pipe 23 which is in the upper end of the cold zone and thus the gas itself is never subjected to any substantial heating as it passes through the tank 16 of the vessel. The only heat exchange which will occur between the cold zone C and the heated zone will be at the interface of the liquid level L and the heat which is applied to the liquid body in the heated zone is not sufficient to appreciably heat the zone C because of the relatively large volume of cold gas constantly circulating through said zone. In actual practice the temperature of the gas which is withdrawn from the pipe 23 is below the melting point of the hydrates or frozen particles and thus, the gas which flows outwardly through the pipe 23 will not pick up any of the liquids which have been previously condensed.

The frozen particles and liquids fall downwardly into the lower heated zone H of the vessel and are warmed sufficiently to liquefy or melt the same. Any vapors which might tend to rise from the body of liquid will move into contact with the extremely cold zone which is maintained by the incoming cold gas and upon contact with the cold gas will be recondensed and fall back into the liquid. Thus, the vessel contemplates two separate zones within the vessel with one zone being maintained at a sufficiently low temperature to prevent any heating of the gas circulating through the vessel and the other being maintained sufficiently heated to liquefy or melt the hydrates or frozen particles, whereby the water may be withdrawn as a liquid. As has been noted, the gas circulating through the tank 16 is at a temperature which is below the liquefying or melting point of the frozen particles and this assures that the vapor carrying capacity of the gas is not increased as it flows through the vessel. It is preferable that the temperature of the gas in the upper end of the tank 16 be the lowest temperature of the gas throughout the entire system so that after the gas is conducted from the tank, its temperature will never be lower than it is at that point. In this manner, any change in temperature of the gas will be in an upward direction, that is, the gas will be warmed, with the result that condensation of any liquids which might be in the vapor phase when the gas leaves the tank 16 will never occur. It is apparent that the separation is carried out in a low temperature zone whereby maximum hydrocarbon liquid recovery is effected.

In Figure 3, a modification of the invention is illustrated wherein the cold gas from the line 23 is utilized to pre-cool the hot high pressure gas stream flowing from the well through the flow line or conduit 10. In this form a heat exchanger 24 includes a casing 25 having liquid therein. The flow line 10 is conducted through the heat exchanger casing and it is preferable that that portion of the conductor in the casing be in the form of a coil 10b. The withdrawal pipe 23 extending from the upper end of the vessel 15 is also conducted through the casing 25 of the heat exchanger and thus the cold gas is utilized to impart a cooling to the hot gas stream coming from the well, with this cooling being in advance of the free water knockout unit A. By cooling the gas stream in the line 10 in advance of the water knockout unit A, condensation of liquid is encouraged so that additional free water may be removed by the unit A before the gas stream passes to the separator vessel 15.

The heat exchanger 24 is actually a gas-to-liquid heat exchanger since liquid is contained within the casing 25. If desired, any suitable type of heat exchanger may be employed and in Figure 4 a slightly modified arrangement is illustrated. In this form a casing 26 has the conductor 23 connected thereto at one side of the casing with an outlet conductor 23a extending from the opposite end and whereby the cold gas is circulated through the casing 26. The main flow line 10 having the coil 10b has said coil located within the casing 26 and in this instance, a gas-to-gas heat exchange is produced to cool the gas stream in the main line 10.

The liquids which are separated in the vessel 15 may be taken to any suitable vessel and in Figure 3 the discharge line 20 from the lower tank 17 of the separator vessel 15 is shown connected to a horizontal type separator 27. This separator functions to separate the hydrocarbon liquids which are withdrawn through line 28 from the water which is withdrawn through line 29.

In Figure 5 a modification of the form shown in Figure 1 is illustrated wherein a second stage separator 30 receives the liquid discharge from the tank 17 through line 20. Some of the liquids which have been heated in the heated zone H of the vessel 15 may vaporize in their flow from the tank 17 to the separator 30 and in order to recondense these vapors so that they may be recovered as liquid the withdrawal pipe 23 which extends from the tank 16 of the vessel 15 is disposed within the upper portion of the separator 30. In this manner, the cold gas being withdrawn from the cold zone C of the vessel 15 is utilized to assure condensation of the vapors within the second stage of separation.

In Figures 1-5 a free water knockout unit A is illustrated as connected in the flow line in advance of the vessel 15 and as has been described, the free water is removed from the line prior to the passage of the flow stream to the vessel. In some instances the well stream may contain an excessive amount of distillate in the liquid phase and it may be desirable to remove this liquid before directing the flow stream to the separator vessel 15. In such case a unit B for removing the hydrocarbon liquid is interposed between the free water knockout A and the separator vessel 15.

As illustrated in Figure 6, the unit B comprises a separating tank 11a and a hydrocarbon liquid accumulating tank 12a. The structure of the unit B is similar to that of the unit A with the hydrocarbon liquid being removed from the liquid accumulating tank 12a of the unit B through a line 13a which extends to the tank 17 of the vessel 15. The gas from which the hydrocarbon liquid has been separated is conducted from the upper separating tank 11a of the unit B through a line 10b which connects with the coil 21 of the vessel 15. As in the other forms hereinbefore described the gas then flows through the line 10a, choke 22 and into the cold zone C of the tank 16 of the vessel 15. The hydrocarbon liquid which was separated by the unit B passes through the tank 17 of the vessel 15 and is discharged therefrom through the discharge line 20.

It will be evident that the form shown in Figure 6 operates in substantially an identical manner except that the hydrocarbons which are in the liquid phase are removed from the flow stream which is ultimately directed to the cold zone C of the separating vessel 15. Thus, the flow stream has all of the liquids which are in a liquid phase removed therefrom before passage to the vessel 15.

The particular construction of the vessel 15 is subject to variation and in Figure 7 a particular form of vessel is illustrated. In this form the vessel comprises a vertical tank 31 which has a coil 32 disposed therein. The main flow line 10 extending from the well or other source of high pressure gas is connected to the upper end of the coil 32 and a line 110 extends from the lower end of the coil to the upper separating tank 11 of the water knockout unit A. Upon leaving the water knockout unit the flow stream is conducted through a pipe 110a to the upper end of the vessel 31. A fixed choke orifice 22a is connected in the pipe 110a and functions to reduce the pressure to effect a temperature reduction sufficient to form hydrates or frozen particles. A body of liquid is maintained at the level L by a float mechanism 18a which controls operation of a dump valve 19a connected in the discharge line 20a. The space within the vertical tank 31 above the liquid level L constitutes the cold zone C while the area below the liquid level comprises the heated zone H. The gas is withdrawn from the vessel through an outlet pipe 33. It will be evident that in this form of the invention the main flow stream is taken through the coil 32 in the vessel 31 prior to the time that it is conducted to the water knockout unit A, whereas in Figure 1 the flow is first through the water knockout and then through the vessel 15.

The operation of the form shown in Figure 7 is identical to the form of vessel which is composed of two connected tanks 16 and 17. The gas stream has its pressure reduced to the point where the temperature is lowered and hydrates or frozen particles are formed. The gas stream together with condensed liquids and frozen particles are conducted to the cold zone C of the separator tank 31 and may precipitate downwardly into contact with the liquid. The gas rises and escapes through the pipe 33 with the temperature of the gas being maintained at a point well below the point at which the frozen particles will liquefy or melt. The only heat exchange area will be at the interface between the liquid body and the cold gas in the lower portion of the cold zone C.

It has been found that the particular method and apparatus disclosed herein not only removes substantially all of the water from the high pressure gas but also results in increased recovery of hydrocarbon liquid fractions which are ordinarily present in the high pressure gas in the vapor phase. When these liquids are condensed by the cooling effect created at the choke, such liquids are taken into the separator vessel and being in contact with the cold zone C remain in a liquid form as they precipitate downwardly to the liquid body; upon admixture with the heavier liquid the tendency for the lighter fractions to vaporize is reduced and the recovery of these lighter fractions is thereby increased.

By maintaining the cold zone and dehydrating the gas under low temperature conditions it has been found that the gas is sufficiently dry to meet most pipe line specifications. The provision of the free water knockout in advance of the separator vessel 15 in Figure 1, or the vessel 31 in Figure 7, removes all of the free water with the result that there is actually a minimum amount of water which is converted into hydrates within the vessel; for this reason the extreme cooling, although forming hydrates or frozen particles, does not clog the pipes or the separator vessel since the ratio of the volume of gas to the frozen particles is relatively great. In other words, by first removing the free water, subsequent freezing of the water vapor can be carried out without interfering with the separation effected in the vessels 15 or 31.

As used herein, the term "frozen particles" includes hydrates as they are generally known in the gas industry, ice particles or any solidified particles which are capable of being reduced to a liquid by the application of heat. As used herein and in the appended claims, the terms "hydrocarbon liquids" and "hydrocarbon condensate" include hydrocarbon components of gaseous well streams and said terms are to be construed in accordance with their accepted meaning throughout the oil and gas industry.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of this invention without departing from the scope thereof, it is to be understood that all matter herein set forth or shown in the accompanying drawings is to be interpreted as illustrative and not in a limiting sense.

Having described the invention, I claim:

1. The method of separating liquids from a high pressure gas stream flowing from a high pressure well including, flowing the stream through a conduit, removing the free liquids present in the stream from said conduit, thereafter expanding the gas stream to reduce the temperature of the gas stream to a point where hydrocarbon condensate and water normally present in the vapor state under initial flow stream temperature and pressure are condensed and also to the point where the condensed water will form frozen particles, directing the condensate and frozen particles into a chamber to create a cold zone therein from which said condensate and frozen particles precipitate downwardly, directing the precipitated condensate and frozen particles into a warm zone below the cold zone whereby the frozen particles are converted to a fluent state, withdrawing the gas from the cold zone, and withdrawing said condensate and frozen particles in a fluent state from the warm zone.

2. The method as set forth in claim 1, wherein the temperature in the cold zone is maintained below the liquefying point of the frozen particles and also wherein the temperature in the warm zone is maintained above the liquefying point of the frozen particles.

3. The method as set forth in claim 1, together with the additional step of conducting the gas stream through the warm zone prior to the expansion and temperature reduction of the gas stream, whereby the gas stream is utilized to heat the warm zone.

4. The method as set forth in claim 1, together with the additional step of conducting the gas stream through the warm zone prior to the removal of free liquids from the gas stream and also prior to the expansion and temperature reduction of said gas stream, whereby the heat of said gas stream is utilized to maintain the temperature of the warm zone.

5. The method as set set forth in claim 1 wherein the gas is withdrawn from the cold zone at substantially the same temperature as that at which the gas was directed into said cold zone.

6. The method of separating liquids from a high pressure gas stream flowing from a high pressure well including, flowing the stream through a conduit extending from the well, removing the free water in said stream from said conduit while the stream is under relatively high pressure, thereafter restricting the flow of the gas stream to expand the gas and effect a reduction in temperature to a point where hydrocarbon condensate and water normally present in the vapor state under initial flow stream pressure and temperature are liquefied and also to the point where the liquid water forms hydrates, discharging the stream having the liquefied condensate and the hydrates therein into the upper portion of a chamber which forms a cold zone from which the condensate and hydrates precipitate downwardly into a warm zone below the cold zone, subsequently decomposing the hydrates in said warm zone, maintaining a predetermined liquid level in the warm zone, withdrawing the gas from the cold zone without subjecting said gas to any substantial heating in its passage through the chamber, and withdrawing the liquids from the warm zone.

7. The method as set forth in claim 6, wherein the temperature in the cold zone is maintained below the temperature at which said hydrates form at the existing pressure in the said cold zone, and also wherein the temperature in the warm zone is maintained above the temperature at which said hydrates decompose at the existing pressure in the warm zone.

8. The method as set forth in claim 6, together with the additional step of conducting the gas stream through the warm zone prior to the restricting of flow and the temperature reduction of said gas stream whereby the heat of said gas stream is utilized to heat the warm zone.

9. The method as set forth in claim 6, wherein the gas which is withdrawn from the cold zone is passed in heat exchange relationship with the gas stream prior to the removal of free water from said stream, whereby the gas stream is cooled.

10. The method of separating liquids from a high pressure gas stream flowing from a high pressure well including, flowing the stream through a conduit extending from the well, removing the free liquids which are present in the stream from said conduit while the stream is under relatively high pressure, thereafter restricting the flow of the gas stream to expand the gas and effect a reduction in temperature to a point where hydrocarbon condensate and water normally present in the vapor state under initial flow stream conditions of pressure and temperature are liquefied and also to the point where the liquid water forms hydrates, discharging the stream having the liquefied condensate and the hydrates therein into the upper portion of the chamber which forms a cold zone from which the condensate and hydrates precipitate downwardly into a warm zone below the cold zone, subsequently decomposing the hydrates in said warm zone, conducting to the warm zone hydrocarbon liquids which have been previously removed from the gas stream with free liquids prior to the restriction of flow and temperature reduction of the gas stream, withdrawing the gas from the cold zone without subjecting said gas to any substantial heating in its passage through the chamber, and withdrawing the liquids from the warm zone.

11. The method as set forth in claim 10, together with the additional steps of conducting the gas stream through the warm zone prior to the restricting of flow and temperature reduction of said gas stream whereby the heat of said gas stream is utilized to heat the warm zone, and passing the gas which is withdrawn from the cold zone in heat exchange relationship with the gas stream prior to the removal of free liquids from said stream whereby the gas stream is cooled at a point in advance of the removal of free liquids.

12. The method as set forth in claim 6, together with the additional steps of conducting the liquids which are withdrawn from the warm zone to a zone of lower pressure, and utilizing the gas which is withdrawn from the cold zone to condense vapors evolving from the liquid within the zone of lower pressure.

13. An apparatus for separating liquids from a high pressure gas stream flowing from a high pressure well including, a flow conduit connected to the well for conducting from the well a gas stream having hydrocarbon condensate and water in the liquid and vapor phases present therein, a liquid knockout unit connected to the flow conduit for removing free liquids from the gas stream whereby the gas stream is conducted through said unit and free liquids are removed therefrom, a separator vessel having a cold zone in its upper portion and a warm zone in its lower portion, a conductor between the liquid knockout unit and the cold zone of the separator vessel for conducting the gas stream from the liquid knockout unit to the separator vessel, means mounted in said conductor for expanding the gas stream to reduce the temperature of the gas stream to a point where hydrocarbon condensate and water normally present in the vapor phase under initial flow stream pressure and temperature are condensed and also to the point where condensed water is frozen into hydrates, said stream having the condensate and hydrates therein being conducted directly to the cold zone of the separator vessel through said conductor and subsequent to the passage of the stream through the expanding means, said condensate and hydrates precipitating downwardly from said cold zone into the warm zone of the separator vessel, heating means within the warm zone for heating said zone to melt the hydrates, a gas outlet in the upper portion of the cold zone and a liquid outlet extending from the warm zone.

14. An apparatus for separating liquids from a high pressure gas stream flowing from a high pressure well including, a flow conduit adapted to be connected to the well for conducting from the well a gas stream having hydrocarbon condensate and water in the liquid and vapor phases present therein, a water knockout unit connected to the flow conduit for removing free water from the gas stream whereby the gas stream is conducted through said unit and free water is removed therefrom, a separator vessel having a cold zone in its upper portion and a warm zone in its lower portion, a conductor between the water knockout unit and the cold zone of the separator vessel for conducting the gas stream having free water removed therefrom from said water knockout unit to said cold zone of the separator vessel, means mounted in said conductor for expanding the gas stream to reduce the temperature of the gas stream to a point where hydrocarbon condensate and water normally present in the vapor phase under initial flow stream pressure and temperature are condensed and also to the point where water is frozen into hydrates, said stream having the condensate and hydrates therein being discharged into the cold zone of the separator vessel from said conductor subsequent to the passage of the stream through the expanding means, said condensate and hydrates precipitating downwardly from the cold zone into the warm zone of the separator vessel, means within the warm zone for maintaining a predetermined liquid level in said warm zone, heating means within the warm zone for heating said zone to decompose hydrates which precipitate thereinto, a gas outlet extending from the cold zone, and a liquid outlet extending from the warm zone.

15. An apparatus as set forth in claim 14, wherein the separator vessel comprises a horizontally disposed section forming the warm zone and a vertical section communicating with said horizontal section and forming the cold zone.

16. An apparatus as set forth in claim 14, wherein the flow conduit extending from the well has a portion thereof disposed within the warm zone of the separator vessel, whereby the heat of the gas stream flowing through said conduit heats said warm zone.

17. An apparatus as set forth in claim 14, wherein the conductor extending between the water knockout unit and the cold zone of the separator vessel has a portion thereof disposed within the warm zone of the separator vessel, whereby the heat of the gas stream flowing through said conductor heats said warm zone.

18. An apparatus for separating liquids from a high pressure gas stream flowing from a high pressure well including, a flow conduit connected to the well for conducting from the well a gas stream having hydrocarbon condensate and water in the liquid and vapor phases present therein, a liquid knockout unit connected to the flow conduit for removing free liquids from the gas stream whereby the gas stream is conducted through said unit and free liquids are removed therefrom, a separator vessel having a cold zone in its upper portion and a warm zone in its lower portion, a conductor between the liquid knockout unit and the cold zone of the separator vessel for conducting the gas stream from the liquid knockout unit to the separator vessel, means mounted in said conductor for expanding the gas stream to reduce the temperature of the gas stream to a point where hydrocarbon condensate and water normally present in the vapor phase under initial flow stream pressure and temperature are condensed and also to the point where condensed water is frozen into hydrates, said stream having the condensate and hydrates therein being conducted directly to the cold zone of the separator vessel through said conductor and subsequent to the passage of the stream through the expanding means, said condensate and hydrates precipitating downwardly from said cold zone into the warm zone of the separator vessel, heating means for heating the warm zone to melt the hydrates without materially affecting the temperature of the cold zone, a gas outlet in the upper portion of the cold zone, and a liquid outlet extending from the warm zone.

ARTHUR F. BARRY.

REFERENCES CITED

The following references are of record in the file of this patent:

UNITED STATES PATENTS

| Number | Name | Date |
| --- | --- | --- |
| 2,193,309 | Wheless | Mar. 12, 1940 |
| 2,284,112 | Walker | May 26, 1942 |
| 2,332,201 | Buckley | Oct. 19, 1943 |
| 2,375,559 | Hutchinson et al. | May 8, 1945 |
| 2,399,723 | Crowther | May 7, 1946 |
| 2,410,583 | Hutchinson | Nov. 5, 1946 |